(12) United States Patent
Allo

(10) Patent No.: US 10,929,319 B2
(45) Date of Patent: *Feb. 23, 2021

(54) DATA STORAGE DEVICE WITH FRONT END BUS

(71) Applicant: Seagate Technology LLC, Cupertino, CA (US)

(72) Inventor: Christopher Nicholas Allo, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,382

(22) Filed: May 10, 2019

(65) Prior Publication Data

US 2019/0347222 A1 Nov. 14, 2019

Related U.S. Application Data

(60) Provisional application No. 62/670,428, filed on May 11, 2018.

(51) Int. Cl.
*G06F 13/10* (2006.01)
*G06F 13/16* (2006.01)
*G11B 5/82* (2006.01)

(52) U.S. Cl.
CPC ............ *G06F 13/1684* (2013.01); *G11B 5/82* (2013.01)

(58) Field of Classification Search
None
See application file for complete search history.

(56) References Cited

U.S. PATENT DOCUMENTS

| 6,807,504 | B2* | 10/2004 | Chen ................... G06F 11/2221 326/30 |
| 7,983,032 | B2* | 7/2011 | Walker .................... G06F 1/187 312/223.2 |
| 8,301,810 | B2 | 10/2012 | Pang et al. |
| 8,358,499 | B2 | 1/2013 | Jacobs et al. |
| 8,508,928 | B2* | 8/2013 | Killen .................. G11B 33/124 361/679.33 |
| 8,626,985 | B2 | 1/2014 | Chung et al. |
| 8,838,895 | B2* | 9/2014 | Yi ........................ G06F 12/0868 711/103 |
| 9,658,781 | B2* | 5/2017 | Dolph .................... G06F 3/0611 |
| 9,715,258 | B1 | 7/2017 | Bai et al. |
| 9,927,981 | B2* | 3/2018 | Moon ...................... G06F 3/061 |
| 10,013,172 | B2 | 7/2018 | Jacobs et al. |
| 10,394,493 | B2* | 8/2019 | Tang ...................... G06F 3/0605 |
| 10,430,329 | B2* | 10/2019 | Sun ........................ G06F 3/0631 |
| 10,474,361 | B1* | 11/2019 | Allo ....................... G06F 3/0607 |

(Continued)

*Primary Examiner* — Cheng Yuan Tseng

(74) *Attorney, Agent, or Firm* — Hall Estill Attorneys at Law

(57) ABSTRACT

A data storage device can employ a front end bus to optimize data storage performance. A first controller may be connected to a first memory via a first bus and to a second memory via a second bus with the first bus and first memory housed within an internal cavity of an enclosure while the second bus is exposed to an exterior surface of the housing and the second memory is separated from the internal cavity. The first controller can be configured to substitute the second memory for the first memory in response to a front end controller identifying a type of data storage of the second memory.

20 Claims, 5 Drawing Sheets

(56) References Cited

U.S. PATENT DOCUMENTS

| | | | |
|---|---|---|---|
| 10,474,397 B2 * | 11/2019 | Lamberts | G06F 3/0658 |
| 2007/0214331 A1 | 9/2007 | Murphy | |
| 2013/0159622 A1 * | 6/2013 | Cohen | G06F 3/0683 |
| | | | 711/114 |
| 2015/0134877 A1 * | 5/2015 | Moon | G06F 12/0871 |
| | | | 711/103 |
| 2017/0371554 A1 * | 12/2017 | Moon | G06F 3/061 |
| 2017/0371589 A1 * | 12/2017 | Keeler | G06F 3/061 |
| 2018/0032432 A1 * | 2/2018 | Kowles | G06F 3/064 |
| 2018/0088833 A1 * | 3/2018 | Tiotantra | G06F 3/0613 |
| 2018/0210675 A1 * | 7/2018 | Tang | G06F 12/0246 |
| 2019/0121571 A1 * | 4/2019 | Wahla | G06F 3/061 |

* cited by examiner

DATA STORAGE DEVICE WITH FRONT END BUS

RELATED APPLICATION

The present application makes a claim of domestic priority under 35 U.S.C. 119(e) to U.S. Provisional Application No. 62/670,428 filed May 11, 2018, the contents of which are hereby incorporated by reference.

SUMMARY

In some embodiments, a data storage device has a first controller connected to a first memory via a first bus and to a second memory via a second bus with the first bus and first memory housed within an internal cavity of an enclosure while the second bus is exposed to an exterior surface of the housing and the second memory is separated from the internal cavity. The first controller can be configured to substitute the second memory for the first memory in response to a front end controller identifying a type of data storage of the second memory.

A data storage device, in accordance with other embodiments, is operated by connecting a first controller to a first memory via a first bus with the first bus and first memory housed within an internal cavity of an enclosure while the second bus is exposed to an exterior surface of the housing and the second memory is separated from the internal cavity. Connecting a second memory to a front end controller to via a second bus allows a type of data storage of the second memory to be identified with the front end controller and operation of the first memory to be substituted with the second memory in response to the identified type of data storage.

Various embodiments of a data storage device connect a first controller to a first memory via a first bus with the first bus and first memory housed within an internal cavity of an enclosure while the second bus is exposed to an exterior surface of the housing and the second memory is separated from the internal cavity. Connecting a second memory to a front end controller to via a second bus allows a type of data storage of the second memory to be identified with the front end controller and operation of the first memory to be substituted with the second memory in response to the identified type of data storage. The second memory is then mated to the second bus.

DETAILED DESCRIPTION

The assorted embodiments of this disclosure are generally directed to a data storage device with a front end bus that allows distributed memory space to be utilized to optimize data storage performance.

As computing components have become more sophisticated, data is more easily generated and transferred. However, performance of some data storage devices can be a bottleneck in some data storage systems. Accordingly, embodiments of a data storage device optimize performance by supplementing a first type of data storage with a different second type of data storage via a front end bus. The ability to add different types of data storage together allows a user to selectively utilize a front end bus to enhance the data storage characteristics of the different data storage types.

Accordingly, a data storage device, in some embodiments, is configured with a data storage device having a first controller connected to a first memory via a first bus and to a second memory via a second bus with the first bus and first memory housed within an internal cavity of an enclosure while the second bus is exposed to an exterior surface of the housing and the second memory is separated from the internal cavity. The first controller can be configured to substitute the second memory for the first memory in response to a front end controller identifying a type of data storage of the second memory.

Figure 1:
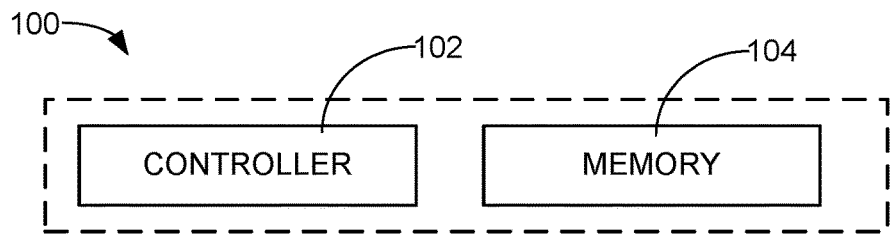
FIG. 1 depicts a block representation of an example data storage device in which various embodiments may be practiced.

FIG. 1 is a block representation of an example data storage device in which various embodiments can be practiced. The data storage device 100 includes a controller 102 and a memory 104. The controller may include one or more hardware and/or programmable processing circuits that execute programming instructions (e.g., firmware) in a local processor memory to provide top level control functions for the device. The memory 104 includes non-volatile memory (NVM) for the storage of user data from a host device.

Data storage devices store and retrieve data in a fast and efficient manner.

Some data storage devices, such as hard disc drives (HDDs), store data in memory 104 that uses rotatable data recording media. Such media may take the form of one or more magnetic recording discs which are accessed using a corresponding array of data transducers (heads).

The transducers incorporate sliders with air bearing surfaces that aerodynamically support the sliders in close proximity to the media surfaces by fluidic currents of the surrounding atmosphere established by high speed rotation of the media. Write elements are supported by the sliders to magnetically write data in the form of alternating magnetic patterns to tracks defined on the media surfaces. Read sensors are supported by the sliders to sense the magnetic patterns and recover the previously stored data. Other active and passive elements can be incorporated into the sliders such as a head assisted magnetic recording (HAMR) system, a fly height adjustment mechanism, a contact sensor, etc.

Other forms of data storage devices such as solid-state drives (SSDs) use solid-state semiconductor memory to provide non-volatile memory storage. The memory may be erasable memory such as NAND or NOR flash, or may be rewritable-in-place memory such as STRAM, RRAM, PCRAM, etc. Solid-state memory tends to provide significantly faster data input/output (I/O) transfer rates as compared to rotatable media, since the solid-state memory does not involve the latencies normally associated with moving the transducer to a target track and waiting for the disc to rotate past the transducer. At the same time, solid-state memory tends to be more expensive than rotatable media, and may have other performance related issues as well such as limited program/erase (PE) count service life, etc.

So-called hybrid devices use multiple different forms of non-volatile memory to store user data for a host device. Some hybrid devices combine the rotatable media of a hard disc drive (HDD) with the flash memory of a solid-state drive (SSD) to provide a hybrid solid-state drive (HSSD). An HSSD utilizes the rotatable media for long term storage of user data, and promotes (pins) certain data sets to the faster flash memory to achieve higher data transfer rate performance. While operable, the continued demand for ever faster data transfer throughput performance presents a need for further improvements in the manner in which hybrid devices are managed, particularly in mass storage (multi-device) environments.

As explained below, a data storage device includes a top level (primary) controller configured to store data to a main non-volatile memory (NVM), and a front end controller configured to store data to a secondary NVM. The secondary NVM has a different construction as compared to the main NVM and has a higher data transfer rate than the main NVM. While not limiting, in some embodiments the primary and front end controllers comprise programmable processors, the main NVM is a stack of one or more rotatable magnetic recording discs, and the secondary NVM is NAND flash memory.

The storage device is configured to operate in different processing modes. These modes are respectively referred to as a normal I/O mode and a front end I/O mode. During the normal I/O mode, the top level controller receives access commands from a host device and services the commands as required to transfer data between the host device and the storage device. For example, during the servicing of a write command to transfer input write data to the storage device, the top level controller will determine, based on various factors, whether to direct storage of the input write data to the primary NVM (e.g., discs) or the secondary NVM (e.g., flash). The data are thereafter directed to the appropriate memory location(s).

Similarly, during the servicing of a read command to return selected read data back to the host, the top level controller will determine a location of the requested read data and access the primary NVM, secondary NVM or some other memory location (e.g., read or write buffer, etc.) to return the data back to the host. It will be noted that during normal I/O mode, the data stored by the data storage device in the primary and secondary NVMs "belongs" to that storage device in the sense that the data was specifically directed to that storage device from a particular host. The top level controller of the storage device has primary responsibility for the contents and usage of the respective primary and secondary NVMs.

During the front end I/O mode, however, the secondary NVM of the storage device is controlled by the host device rather than the top level controller. Depending on the architecture of the storage device, commands issued by the host during front end I/O mode may still be initially processed by the top level controller, but the top level controller will forward the commands directly to the controller of the secondary NVM, which will proceed to operate the secondary NVM as a separate memory. This allows the host device to use the faster secondary memory for high priority tasks and data.

In some cases, multiple storage devices may be grouped together into an array to form a large memory space, such as in a multi-device enclosure used in a cloud processing environment. The host device can consolidate the secondary NVM from the storage devices to provide a consolidated, distributed front end memory space. During front end I/O processing, the secondary NVM of a first storage device may store data associated with a different, second storage device in the array.

Figure 2:
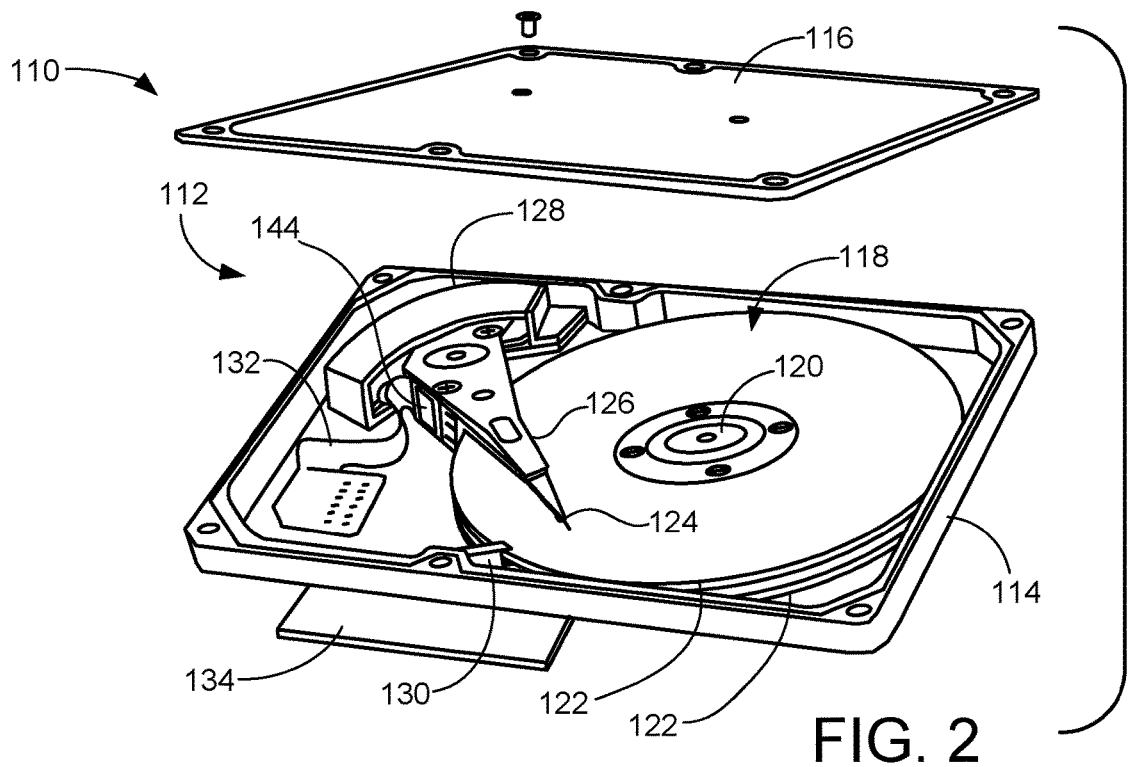
FIG. 2 is a line representation of the storage device of FIG. 1 in accordance with some embodiments.

FIG. 2 shows an example data storage device 110 that corresponds to the data storage device 100 in FIG. 1 in some embodiments. The device 110 is characterized as a hybrid data storage device that uses both HDD (disc) and SSD (flash) NVM to store and retrieve user data. Other forms of data storage devices may be used.

The hybrid device 110 includes an environmentally sealed housing 112 formed from a base deck 114 and top cover 116. A disc stack 118 is disposed within the housing having a spindle motor 120 arranged to rotate a number of magnetic recording discs 122, in this case two, at a constant high speed.

Data are stored to tracks defined on the various disc surfaces using an array of read/write data transducers (heads) 124. The heads 124 are supported by a rotary actuator 126 and are radially positioned using a voice coil motor (VCM) 128. A load/unload parking ramp structure 130 can be used to support the heads 124 away from the disc surfaces when the device 110 is transitioned to a deactivated state. Each combination of head and data recording surface is referred to as a head/disc interface, or HDI.

Control and data signals are passed between the active elements of the actuator 126 and control electronics of the device using a flex circuit assembly 132. The flex circuit assembly passes the signals through the base deck 114 using a bulkhead connector to an external printed circuit board assembly (PCBA) 134. The PCBA 134 supports the control electronics and other external elements of the device.

Figure 3:
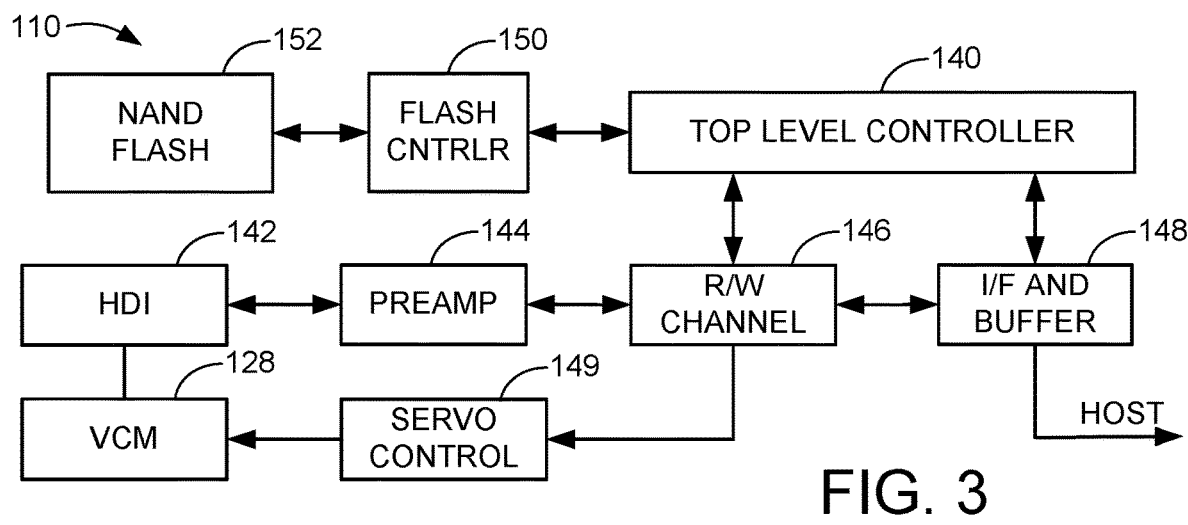
FIG. 3 displays a block representation of portions the storage device of FIG. 2 functionally arranged in accordance with assorted embodiments.

FIG. 3 provides a functional block representation of the hybrid device 110 of FIG. 2 in some embodiments. Other architectures may be used as desired. It will be recognized that many of the elements in FIG. 3 constitute the control electronics supported on the PCBA 134.

A top level controller 140 generally corresponds to the controller 102 in FIG. 1 and provides top level control functions for the device. In some embodiments, the top level controller includes one or more programmable processors and associated firmware incorporated into a system on chip (SOC) integrated circuit device. For reference, the top level controller 140 is also referred to as a first or primary controller, and the recordable discs 122 and heads 124 (e.g., collectively, the HDIs 142) are referred to as a first or primary NVM.

A data path is established between each HDI 142 and the host using a preamplifier/driver circuit (preamp) 144, a read/write (R/W) channel circuit 146 and an interface (I/F) and buffer circuit 148. The preamp 144 may be mounted to the side of the actuator 126 as shown in FIG. 2. The buffer portions of the circuit 148 may take various forms of volatile or non-volatile memory such as DRAM, SRAM, NOR flash, etc. to temporarily store data during data transfers. A servo control circuit 149 uses embedded servo information from the respective discs 122 to provide position control currents to the VCM 128 to position the heads 124.

A flash controller 150 is coupled to the top level controller 140 to provide access control for solid-state memory 152, which in this example takes the form of NAND flash memory. The flash controller 150 may be a separate processor circuit in a different IC or may be incorporated into the main SOC of the top level controller 140. The flash controller 150 is also referred to as a second or secondary controller, and the NAND flash 152 is also referred to as a second or secondary NVM. It is noted that the secondary controller 150 may be resident in the secondary NVM and communicate with a front end controller for some operations. For instance, a front end controller can be part of, or separate from, the top level controller 140 to utilize secondary NVM, via the flash controller 150, for selected data storage device operations.

The respective primary and secondary controllers 140, 150 cooperate during normal I/O data transfer operations to service access (e.g., write and read) commands from the host device using the primary and secondary NVMs 142, 152. A number of different arrangements can be used during such normal operation. In one approach, all input write data is initially written to the NAND flash 152, after which the data are cleaned (migrated) from flash to the discs 122. In another approach, some data sets are written to the flash memory and other data sets are directed to the discs without passing through the flash.

Depending on the data integrity scheme employed by the device 110, all data written to the flash memory may be copied to disc to provide a backup copy, even if the data sets remain in the flash as well. In still other cases, certain hot data may be promoted (pinned) from disc to flash so that a copy of the data is moved to the flash for faster access. Suitable mapping structures are maintained in local memory (e.g., DRAM, etc.) to provide a map of the locations of the various data sets in the system.

It is contemplated that the flash memory 152 and the flash controller 150 in FIG. 3 form a permanent portion of the hybrid device 110, so that these elements are incorporated into the external PCBA 134 shown in FIG. 2. However, in an alternative embodiment, the PCBA 134 is configured as shown in FIG. 4 to accept plug-in SSD cards that can be added as required to supply the flash memory and, as required, the flash controller for the device.

Figure 4:
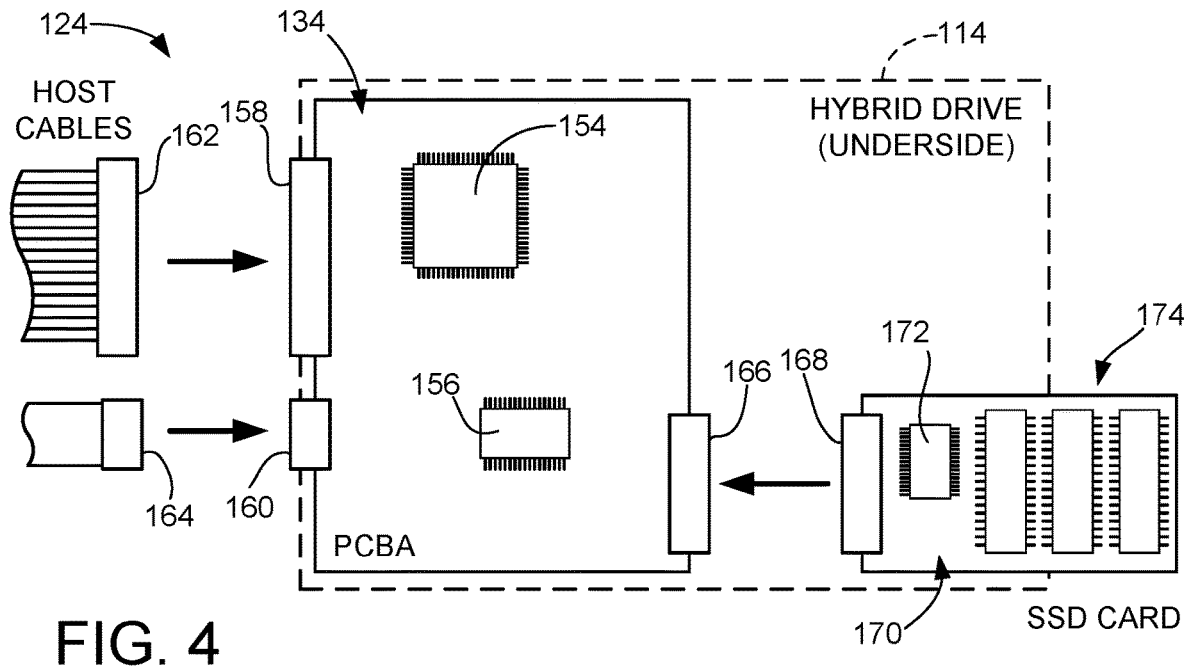
FIG. 4 shows portions of an example data storage device configured in accordance with some embodiments.

FIG. 4 is a bottom side representation of the hybrid device 110. The outermost perimeter of the base deck 114 is represented in broken line fashion. The PCBA 134 is secured to the underside of the base deck 114 using suitable fasteners or other attachment mechanisms. Exemplary control electronics are represented by ICs 154, 156, but it will be understood that the surfaces of the PCBA 134 may include many additional components that have been omitted for clarity of illustration.

The PCBA 134 includes first and second input connectors 158, 160. These connectors can take any suitable forms as desired to support various interconnect protocols including but not limited to SATA, SAS, SCSI, ATA, USB, PCIe, NVMe, Fibre Channel, Firewire, Ethernet, etc. While not limiting, in one embodiment it is contemplated that the first connector 158 provides a multi-pin SATA connection and the second connector 160 provides a serial bus connection. Mating cable assemblies 162, 164 from an upstream host are configured to mate with the PCBA connectors 158, 160. Other attachment configurations can be used, such as by plugging the PCBA into a dongle, a midplane board, etc. Wireless interfaces are also contemplated.

The PCBA connectors 158, 160 are edge connectors aligned along a perimeter edge of the base deck 114 to facilitate easy connection with the connectors 162, 164. The PCBA 134 further includes a front end bus 166 configured to removably mate with a corresponding connector 168 of an external SSD card 170. As before, any number of suitable interconnection arrangements can be used as desired. The bus 166 can be characterized as a front end connector due to the ability to cooperate with other control components, such as ICs 154/156, of the device 124 to manage front end operation of the device. For example, the front end bus 166 can recognize connection of a card 170 employing any type of memory and utilize that memory to optimize front end operation of the device 124 while the rotating data storage media of the disc stack 118 maintains long-term data storage functions.

Although not required, various embodiments position the front end bus 166 to be exposed to an exterior of the base deck 114 while the disc stack 118 is wholly contained within an internal cavity within the housing 112. That is, the SSD card 170 can be separated from the internal cavity of the housing 112 while being physically and electrically connected to the front end bus 166.

The card 170 plugs into the PCBA 134 to add various features such as the flash controller 150 and NAND flash memory 152 from FIG. 3, as generally depicted by ICs 172 and 174. Any number of different types of memory cards can be used, including standardized memory cards (e.g., MemoryStick, SD cards, USB flash drives, etc.). The ability to plug in cards such as 170 provides flexibility in that failed or worn out memory can be easily replaced, the amount of SSD storage can be upgraded, and so on.

In some cases, the flash controller 150 is incorporated into the main PCBA 134, allowing memory modules with flash memory to be coupled via the connectors 166, 168. The PCBA 134 may also incorporate a first amount of flash memory, allowing the SSD card 170 to provide an additional, second amount of flash memory to upgrade the capacity of the device. Other attachment locations and configurations can be used for the SSD card 170, but it is contemplated that, when installed, the SSD card will be recessed within the overall footprint of the storage device (e.g., boundary 114). In some embodiments, the firmware executed by the top level controller 140 can be configured to detect the presence or absence of the SSD card 170, and operate accordingly.

Figure 5:
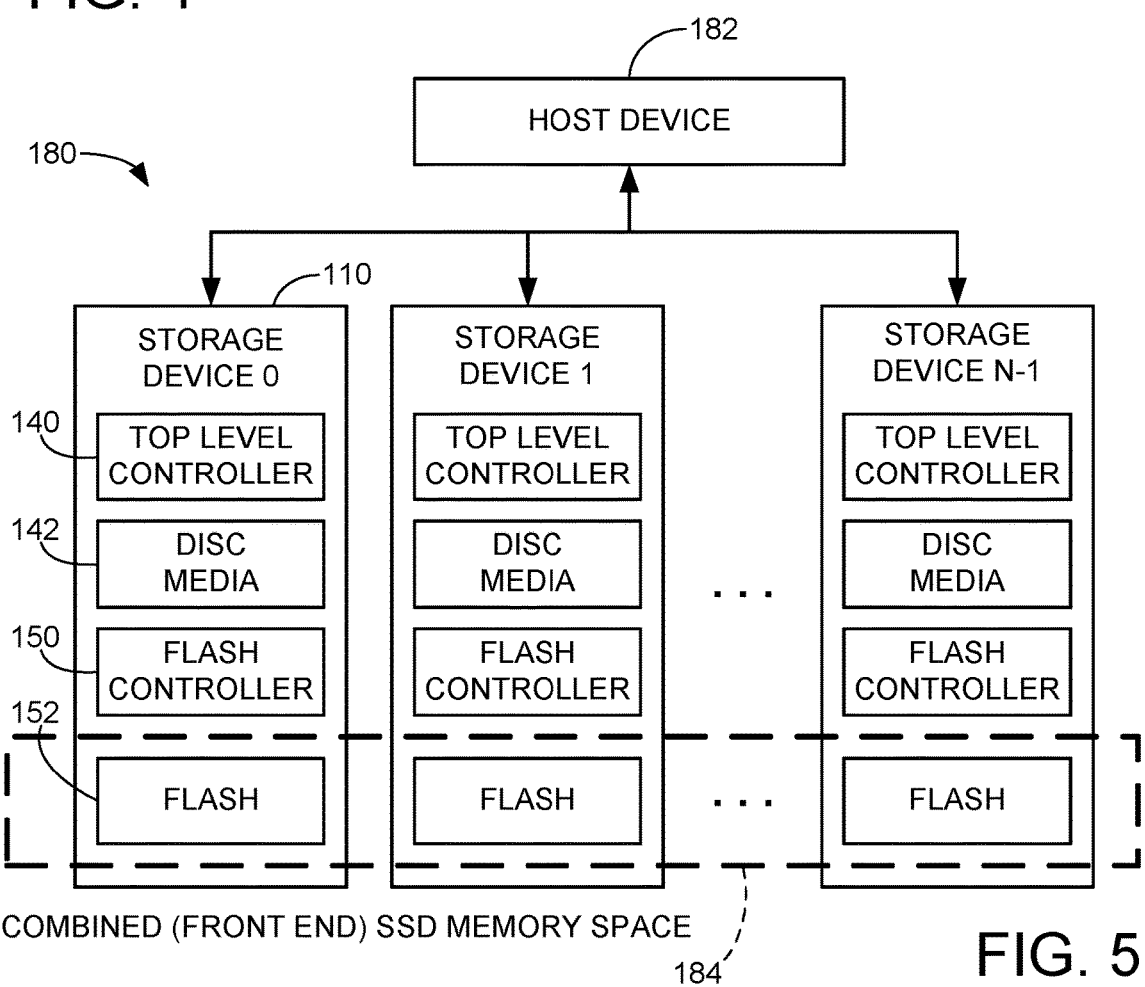
FIG. 5 illustrates a multi-device storage system arranged in accordance with various embodiments.

FIG. 5 shows a multi-device data storage system 180 in which a plural number N of the storage devices 110 are coupled together under the direction of a host device 182. The host device can take any number of suitable forms such as a RAID controller, a server, etc. As desired, the host device 182 can operate to appropriate some or all of the flash memory across the devices 110 to form a combined, or front end, SSD memory space 184.

Figure 6:
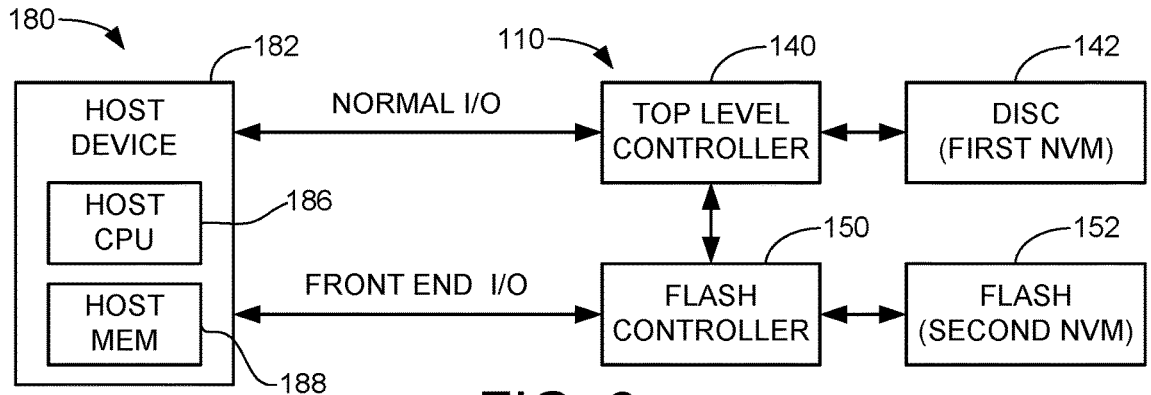
FIG. 6 conveys different modes of operation between the host device and a selected storage device of FIG. 5.

FIG. 6 shows the host device 182 to include a host CPU (programmable processor) 186 and associated host memory 188. The host device 182 operates in two (2) selectable modes during communications with the respective storage devices 110: a normal I/O processing mode and a front end I/O processing mode.

Figure 7:
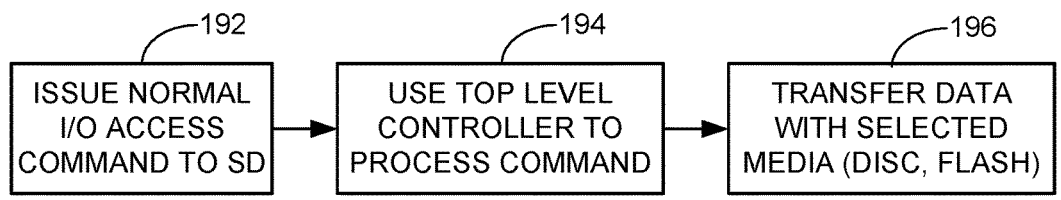
FIG. 7 illustrates a normal I/O processing sequence in some embodiments.

As shown by sequence 190 in FIG. 7, the normal I/O processing mode includes the host device 180 operating to issue access (e.g., read and write) commands to various data storage devices 110. This operation is represented at block 192. A write command will include various control data such as address values (e.g., logical block addresses, LBAs, etc.) for blocks of data, as well as a copy of the write data to be written to NVM by the storage device. A read command will include a range of logical address values to be returned to the host by the storage device.

Block 194 in FIG. 7 shows that the host access command will be initially received and processed by the top level controller 140 of the device 110. This will include various steps such as determining whether to store the data in the disc or flash memory if the command is a write request, or determining the location of the requested data in the flash, disc or other local buffer/cache memory location if the command is a read request. Once the associated location is identified, the access command is serviced at block 196.

Different policies can be used by the top level controller 140 under different normal I/O operating conditions. In some cases, all input data may be written to the flash memory so that the NAND flash operates as a non-volatile write cache, after which the data are migrated (cleaned) to the disc memory at a later time In other cases, higher priority data may be directed to the flash while lower priority data are directed to disc.

Some interface protocols allow the host device to specify a priority level to a given set of data blocks, so that control values in the command may result in the selection of disc or flash memory as the destination location by the top level controller. The controller may monitor and analyze host data access patterns over time and, based on recent access history, direct certain logical ranges of data blocks to the respective disc and flash memory locations.

Regardless, it will be noted that during normal I/O processing, the host device 182 provides access commands to the storage device 110, and it is primarily up to the top level controller 140 to determine the appropriate location(s) for the storage of the data such that data I/O performance between the host and the device is optimized. When data are to be stored to or retrieved from flash, the top level controller will direct the associated commands to the flash controller 150 to proceed with the associated interface actions with the flash memory 152.

The front end I/O processing s a hit different in that it relinquishes control of the flash (or other secondary NVM) by the top level controller 140 of the affected storage device 110. Instead, the host device 182 directly controls the contents of the flash. As shown by sequence 200 in FIG. 8, the front end I/O processing routine is enacted by the host device 180 in a communication with the storage device.

The front end I/O processing mode can be a global command that is issued such that the mode is entered for a selected period of time, during which commands subsequently received from the host are understood as being provided under this mode. Alternatively, both normal I/O mode and front end I/O mode can be enacted concurrently for individual commands so that some commands are provided using front end I/O mode and other commands are issued using normal I/O mode. In this latter case, a portion of the flash memory capacity may be dedicated for host device use, allowing a remaining portion of flash capacity for internal device use. Alternatively, all of the flash may be dedicated for use by the host device for front end processing and the top level controller is limited to storing and retrieving data using the discs.

Figure 8:
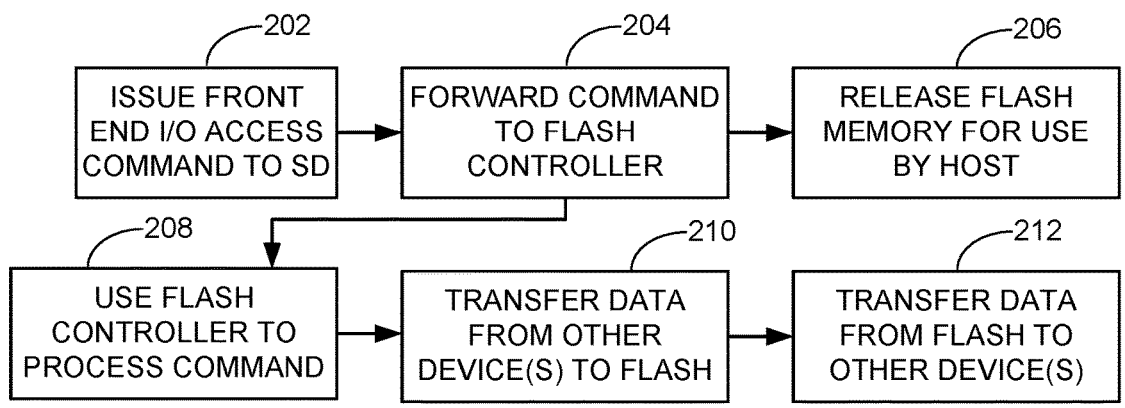
FIG. 8 is a front end I/O processing sequence in some embodiments.

As shown by block 202 in FIG. 8, the host issues a front end I/O access command to the associated storage device 110. In response, the top level controller 140 recognizes and enacts the front end I/O mode at block 204, which includes a bypass direction of the received command to the flash controller 150. As required, assuming that the flash memory 152 currently stores data sets that are being used by the storage device, the top controller 140 releases the flash memory (or the requested portion thereof) for use by the host device.

As noted above, it is contemplated that the hybrid device 110 will operate in at least some modes to ensure (within a reasonable period of time) that all data sets stored in the flash memory 152 during normal mode will be cleaned (migrated or flushed) to the disc memory 142, so that a copy of all current data sets reside on disc memory. However, to the extent required, block 206 may include an immediate flushing operation to transfer all data sets resident in flash to disc to release the flash for host use. Map structures are updated at this time to enable the top level controller 140 to service subsequent access commands involving the disc memory (and the allocated portion of the flash that remains under local device control, if any).

At block 208, the flash controller 150 receives and processes the front end I/O access command, resulting in a transfer of data between the host and the flash, block 210. While not expressly shown in FIG. 8, it will be understood that the host device can concurrently send both normal I/O commands to the storage device, which will be serviced from disc (and allocated flash), and front end I/O commands, which will be directed to the flash controller. The data stored in flash at block 210 may be provided from a different of the storage devices 110 in the array. Block 212 shows a conclusion of the front end I/O processing where control of the local flash is returned to the top level controller 140 and data contents in the flash are transferred to the resident storage device(s), as required.

With reference again to FIGS. 4 and 6, it is possible based on the physical interconnection of the storage device 110 to the host 186 that both front end and normal I/O accesses will be transferred to the storage device 110 using the same interface. In this case, such commands will be passed from the top level controller to the flash controller for servicing. However, as required different interfaces can be used for the respective transfers, such as the SATA and serial interfaces shown in FIG. 4. Because the top level controller will need to manage overall system resources (such as the contents of local buffers, etc.), the top level controller may monitor the progress of the front end commands and the allocation of resources necessary to service such commands. Priority will be given to front end I/O commands, however, on the basis that the host device is in the best position to determine overall data transfer flow.

Referring again to FIG. 5, the front end I/O mode allows the host device to periodically "commandeer" the flash memory in the various storage devices to provide an SSD memory space that is distributed across the various devices. One example where this may be advantageous is in the processing of high demand data transfers where the host may write quickly updated write sets from the various storage devices to the consolidated memory space. This may include data blocks that will ultimately be stored in the disc memory of a different storage device in the array. Other front end usages are envisioned as well.

With regard to cleaning policies, it is contemplated that the top level controllers can operate to store an image of the data in the flash memory during front end I/O processing so that each storage device has a record (and back up copy) of the various data sets. These back up sets can be maintained separately from the normal data stored by the storage device. However, it other embodiments no such cleaning operations are carried out, so that the various flash memory locations are treated as a distributed SSD without the overhead normally associated with hybrid drives.

To this point, it has been observed that current generation SSDs can provide data transfer rate performance on the order of around 300-400 MB/sec or more, while hybrid devices provide data transfer rates that may be a small percentage of this, such as around 10-15% or so. One reason for this is that the total storage capacity of the flash in an HSSD (such as a few GB) is a small percentage of the overall data storage capacity of the discs (usually a few TB). Thus, data transfer performance is limited based on the internal processing by the HSSD in moving various data sets into and out of the limited flash space.

Consolidating the flash memory space among multiple storage devices can allow the host to leverage sole use of the flash to achieve data transfer rates that more closely approximate SSD data transfer rates. It will be appreciated that the host CPU 182 (FIG. 6) will need to operate as a more conventional SSD controller in allocating the storage of the data sets across the consolidated flash memory.

Figure 9:
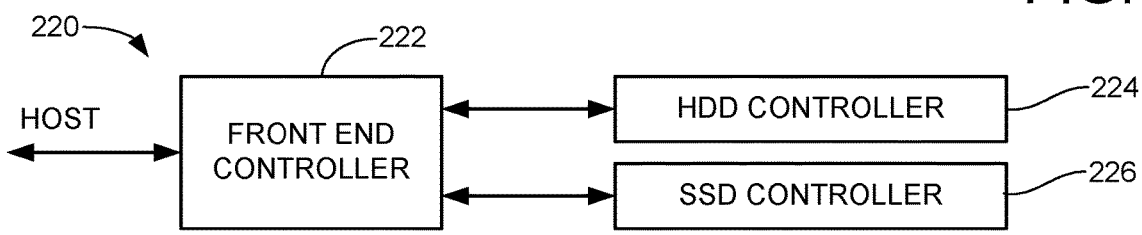
FIG. 9 represents another controller architecture for the data storage device in further embodiments.

FIG. 9 illustrates an alternative controller architecture 220 for a selected one of the data storage devices 110. In this architecture, a front end controller 222 operates individually, or in combination with another controller, to provide top level data storage control, as discussed above, to pass commands in both normal and front end I/O modes to respective HDD and SSD controllers 224, 226.

Figure 10:
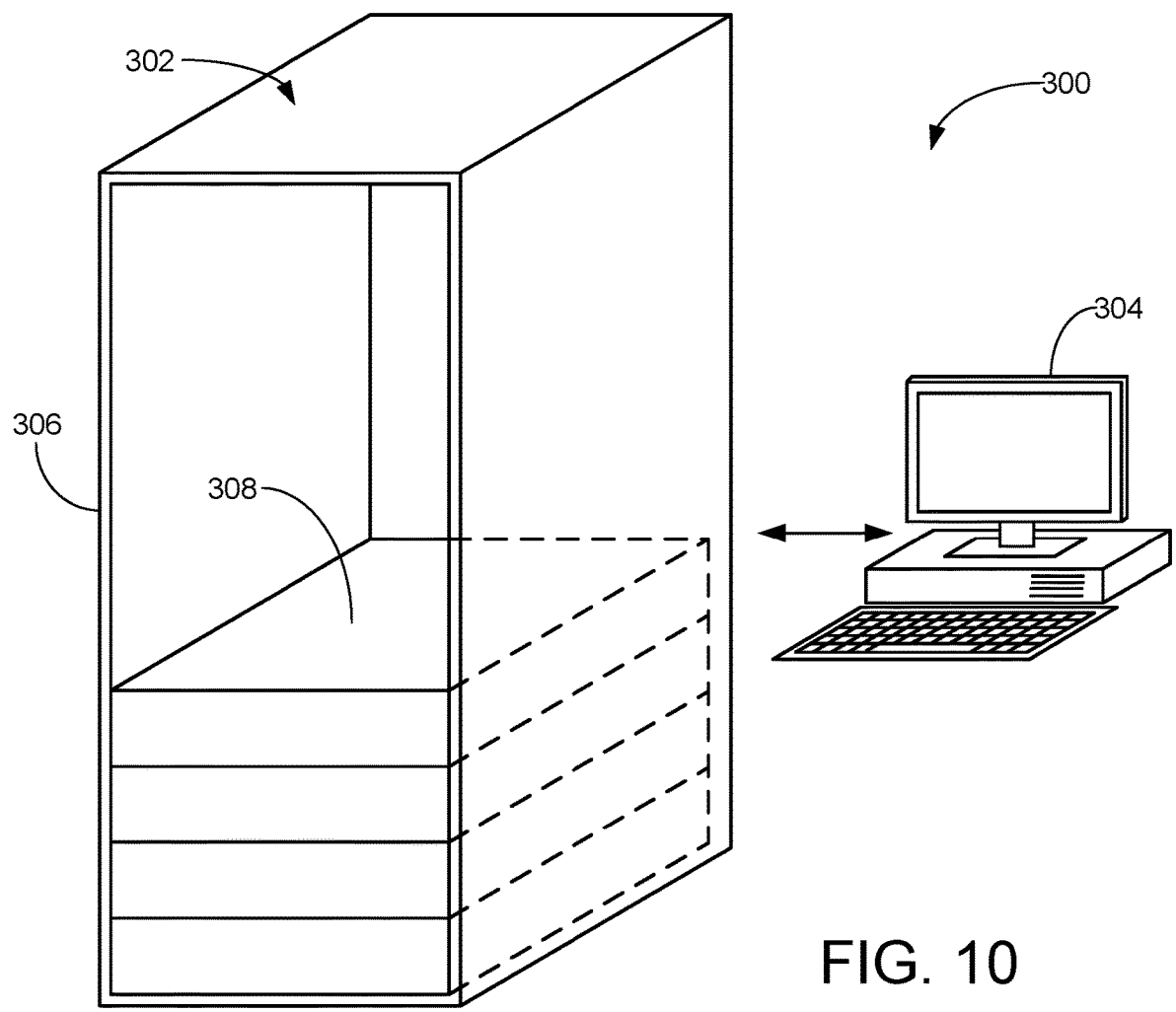
FIG. 10 displays a multi-data storage device computing system in accordance with further embodiments.

FIG. 10 shows a data storage system 300 in which various embodiments of the present disclosure may be advantageously practiced. The data storage system 300 is a mass-data storage system in which a large population of data storage devices such as 110 are incorporated into a larger data storage space to provide a storage node as part of a larger geographically distributed network. Examples include a cloud computing environment, a network attached storage (NAS) application, a RAID (redundant array of independent discs) storage server, etc.

Figure 12:
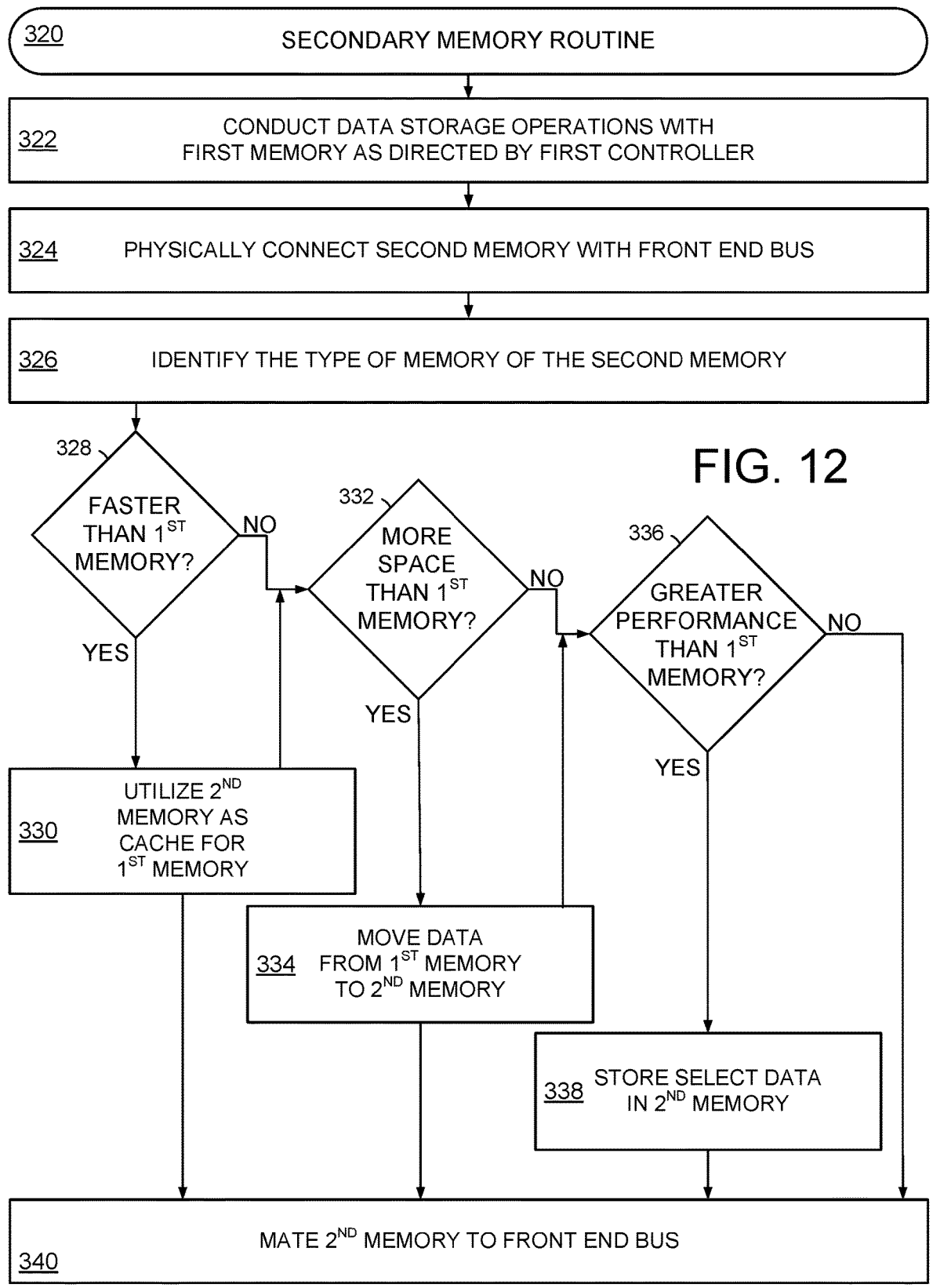
FIG. 12 is a flowchart of an example secondary memory routine that can be executed with the assorted embodiments of FIGS. 1-10.

The system includes a storage assembly 302 and a computer 304 (e.g., server controller, etc.). The storage assembly 302 may include one or more server cabinets (racks) 306 with a plurality of modular storage enclosures 308. While not limiting, the storage rack 306 is a 42 U server cabinet with 42 units (U) of storage, with each unit extending about 1.75 inches (in) of height. The width and length dimensions of the cabinet can vary but common values may be on the order of about 24 in.×36 in. Each storage enclosure 308 can have a height that is a multiple of the storage units, such as 2 U (3.5 in.), 3 U (5.25 in.), etc. to accommodate a desired number of adjacent storage devices 100, as shown in FIG. 12.

Figure 11:
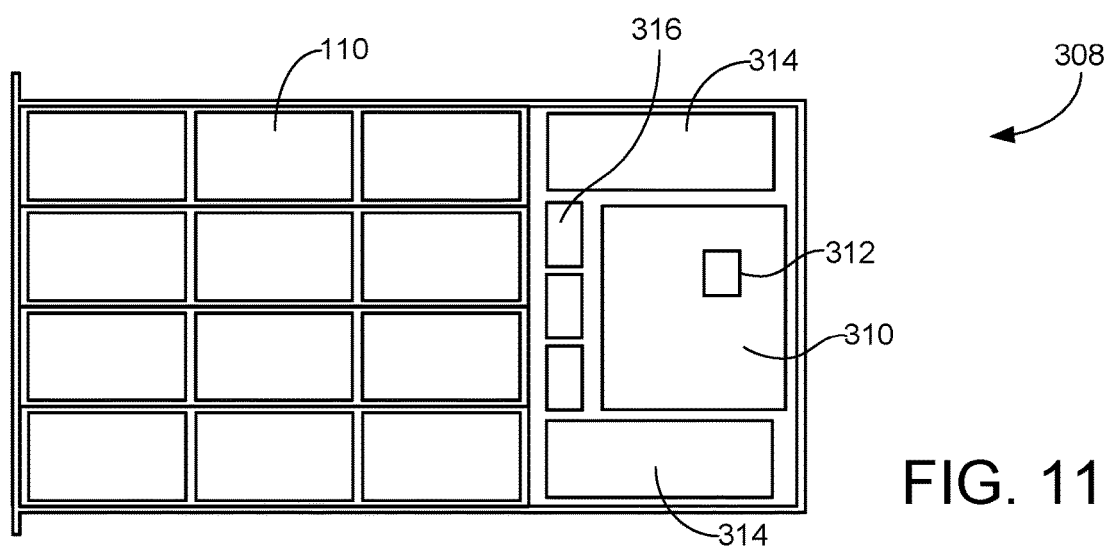
FIG. 11 shows a storage enclosure of the system of FIG. 10 that incorporates a number of data storage devices configured in accordance with various embodiments.

FIG. 11 is a top plan view of a selected storage enclosure 308 that incorporates 36 (3×4×3) of the data storage devices 110. Other numbers and arrangements of data storage devices 110 can be incorporated into each enclosure. The storage enclosure 308 includes a number of active elements to support the operation of the various storage devices, such as a controller circuit board 310 with one or more processors 312, power supplies 314 and cooling fans 316.

The modular nature of the various storage enclosures 308 is provided to permit removal and installation of each storage enclosure into the storage rack 306 including under conditions where the storage devices 100 in the remaining storage enclosures within the rack are maintained in an operational condition. In some cases, the storage enclosures may further be configured with access panels or other features along the outwardly facing surfaces to permit individual storage devices, or groups of devices, to be removed and replaced. Sliding trays, removable carriers and other mechanisms can be utilized to allow authorized agents to access the interior of the storage enclosures as required.

From this it can be seen that storage devices 110 in a given storage enclosure 308, or across multiple enclosures, can be controlled by one or more local host devices (e.g., the processors 312) to consolidate the flash memory (or other NVM) across multiple devices. This provides an on-demand SSD performance feature without the need or expense of mounting both SSDs and HDDs into the various enclosures.

The assorted embodiments of FIGS. 1-11 can be employed in the example secondary memory routine 320 displayed in FIG. 12. Initially, any number of data access operations (data reads & data writes) are conducted in step 322 with the first memory of a data storage device, as directed by the first controller of the data storage device. Step 324 then physically connects a second memory with a front end bus of the data storage device. A front end controller and/or the first controller of the data storage device can identify the second memory in step 326 by any data storage characteristic, such as by type, performance, capacity, and security. It is noted that step 326 may involve the front end controller accessing the second memory, such as with one or more test patterns of data writes and/or reads to different physical block addresses of the second memory.

The identification of the type of second memory, as well as any other data storage characteristics, allows the front end controller to intelligently utilize the second memory to optimize performance of the data storage device. Although not limiting, decision 328 can determine if the second memory faster than the first memory, such as by having a lower average data read, and/or data write, latency. If so, step 330 can utilize the second memory as cache for data until data can be efficiently stored in the first memory.

Decision 332 determines if the second memory has more available data capacity than the first memory. If so, data is moved from the first memory to the second memory in step 334. Such data movement in step 334 can allow the first memory to be partially, or completely, reformatted to better service the data previously stored in the first memory. Movement of data in step 334 can also allow security alterations to the first memory, such as different security keys, encryption codes, and logical-to-physical mapping.

One or more performance characteristics of the second memory are evaluated in decision 336. If the performance is greater than the first memory, step 338 stores select data in the second memory. The selection of step 338 may be for existing data resident in the first memory and/or new data incoming from a remote host. As a non-limiting example, decision 336 may evaluate error rates, power consumption, heat generation, and/or number of data accesses to the respective physical block addresses to determine if overall, or specific, performance is greater in the second memory compared to the first memory. The knowledge of how the second memory provided increased performance allows the front end controller to identify data with selected characteristics, such as security level, size, frequency of data accesses, and/or host origin, to be stored in the second memory instead of the first memory.

As shown, at any time, step 340 can mate the second memory to the front end bus of the data storage device. Mating can comprise any operation that prevents the second memory from being accessed unless physically connected to the front end bus. It is contemplated that the front end controller stores security data in the second memory to mate the second memory to the second bus, with security data comprising a certificate, encryption keys, and/or biographical system data.

In some embodiments, the second memory is mated by encrypting data stored in the second memory and storing an encryption key in the first memory while in other embodiments the second memory is mated by storing biographical information about the data stored in the second memory only in the first memory. In other words, the second memory may be mated with the front end bus by requiring a hand-off of particular information, such as biographical system and/or data information to allow the second memory to be available to service data access requests. For instance, biographical system information may be the total capacity of the first memory, the serial number of the data storage device, or the firmware version of the first memory. Biographical data information may be logical block addresses, physical block addresses, number of data accesses, date of last data access, and/or data track number where the data was initially written.

While various embodiments have contemplated the use of hybrid data storage devices that use rotatable magnetic recording discs as the primary NVM and erasable flash memory as the secondary NVM, this is merely for illustration and is not limiting. Other arrangements can be used including hybrid devices that use other forms of NVM. For example, hybrid storage devices can be provisioned with different tiers of solid-state NVM such as battery-back up operated DRAM (e.g., NV-RAM), erasable flash memory, rewritable semiconductor memory such as STRAM, RRAM, PCRAM, etc. In this case, slower performing memory (such as erasable flash) can be designated as the primary NVM and faster performing memory (such as rewritable RRAM) can be designated as the secondary NVM.

One performance enhancement associated with rewritable memory is the lack of requirement to perform garbage collection operations where current version data blocks are relocated and erasure blocks are subjected to a reset erasure operation. Hence, in some cases it may be advantageous to consolidate the faster rewritable memory as described herein and use the slower erasable memory as the main NVM.

For performance reasons, it is also possible in some cases to operate a given form of memory in different ways that provide different rates of performance. One example is to proceed with garbage collection operations upon a set of rewritable memory rather than overwriting new data in place onto existing data. Another example is to store fewer numbers of bits in a given memory cell to provide faster performance (e.g., faster SLC or MLC programming as compared to slower TLC or 4LC programming). Thus, it will be understood that reference to different types of NVM include but do not necessarily require different physical constructions of the memory, if the memory are instead operated in different (e.g., faster and slower) modes.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising a first controller connected to a first memory via a first bus and to a second memory connected to a front end controller via a second bus, the first bus and first memory housed within an internal cavity of an enclosure, the second bus exposed to an exterior surface of the housing, the second memory separated from the internal cavity and mated to the second bus, the first controller configured to substitute the second memory for the first memory and move data to the second memory in response to a front end controller identifying a type of data storage of the second memory and comparing a data storage error rate performance of the first memory to the second memory.

2. The apparatus of claim 1, wherein the second memory comprises a solid-state memory.

3. The apparatus of claim 1, wherein the second memory comprises a second controller electrically coupled to the front end controller via the front end bus.

4. The apparatus of claim 1, wherein the first memory comprises a magnetic rotating data storage medium.

5. The apparatus of claim 1, wherein the front end bus is removably attached to a connector of the second memory.

6. A method comprising:
   connecting a first controller to a first memory via a first bus, the first bus and first memory housed within an internal cavity of an enclosure;
   connecting a second memory to a front end controller to via a second bus, the second bus exposed to an exterior surface of the housing, the second memory separated from the internal cavity;
   identifying a type of data storage of the second memory with the front end controller;
   comparing a data storage bit error rate performance of the first memory to the second memory with the front end controller; and
   substituting operation of the first memory with the second memory by moving data to the second memory in response to the identified type of data storage and comparison of data storage bit error rate performance of the first memory to the second memory.

7. The method of claim 6, wherein the front end controller utilizes the second memory as a cache for the first memory.

8. The method of claim 6, wherein the front end controller identifies the second memory as a solid-state type of data storage having a faster data transfer rate than the first memory.

9. The method of claim 8, wherein the front end controller identifies the second memory as having greater available data storage capacity than the first memory and moves data from the first memory to the second memory.

10. The method of claim 6, wherein the front end controller stores data in the second memory based on a security level of the data.

11. The method of claim 6, wherein the front end controller substitutes short-term data storage in the first memory with the second memory.

12. The method of claim 6, wherein the front end controller identifies the second utilizes a non-volatile memory express (NVMe) protocol and substitutes priority data access requests from a host to the second memory in response.

13. A method comprising:
   connecting a first controller to a first memory via a first bus, the first bus and first memory housed within an internal cavity of an enclosure;
   connecting a second memory to a front end controller to via a second bus, the second bus exposed to an exterior surface of the housing, the second memory separated from the internal cavity;

identifying a type of data storage of the second memory with the front end controller having a greater performance metric than the first memory;

comparing a data storage error rate performance of the first memory to the second memory with the front end controller;

substituting operation of the first memory with the second memory by moving data to the second memory in response to the identified type of data storage and comparison of data storage error rate performance of the first memory to the second memory; and mating the second memory to the second bus.

14. The method of claim 13, wherein the second memory can only be accessed when physically connected to the second bus.

15. The method of claim 14, wherein the front end controller stores security data in the second memory to mate the second memory to the second bus.

16. The method of claim 15, wherein the security data comprises a certificate.

17. The method of claim 15, wherein the security data comprises an encryption key.

18. The method of claim 13, wherein the second memory is mated by encrypting data stored in the second memory and storing an encryption key in the first memory.

19. The method of claim 13, wherein the second memory is mated by storing biographical information about the data stored in the second memory only in the first memory.

20. The method of claim 13, wherein the second memory is mated by requiring biographical information about the first controller via the second bus prior to allowing data accesses to be serviced.

* * * * *